Figure 1:
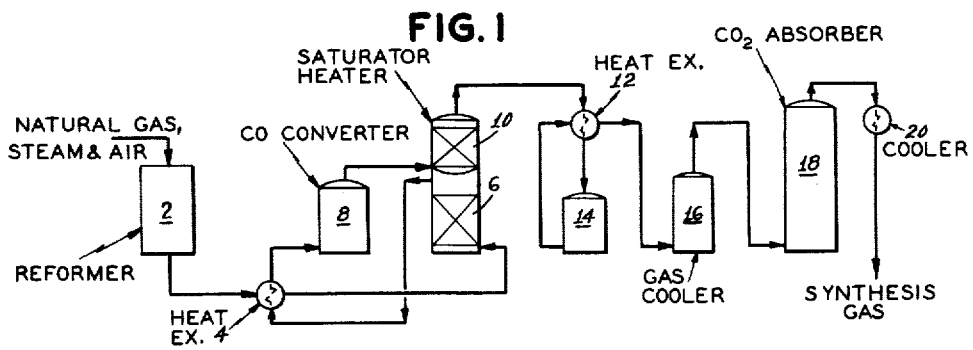

May 7, 1963  M. L. BROWN, JR., ET AL  3,088,919
TREATMENT OF GASES
Filed Sept. 10, 1958  2 Sheets-Sheet 1

INVENTORS
MARION L. BROWN, JR
ALBERT W. GREEN
BY
Karl Huber
James E. Bryan
ATTORNEYS United States Patent Office 3,088,919
Patented May 7, 1963

3,088,919
TREATMENT OF GASES
Marion L. Brown, Jr., and Albert W. Green, Yazoo City, Miss., assignors, by mesne assignments, to Engelhard Industries, Inc., Newark, N.J., a corporation of Delaware, and Mississippi Chemical Corporation, Yazoo City, Miss., a corporation of Mississippi
Filed Sept. 10, 1958, Ser. No. 760,113
11 Claims. (Cl. 252—374)

This invention relates to the preferential oxidation of carbon monoxide in admixture with a hydrogen-containing gas and, more particularly, to the preferential oxidation of carbon monoxide in ammonia synthesis gas, which normally comprises hydrogen and nitrogen, and may contain traces of methane.

Due to the sensitivity of the catalyst used in ammonia synthesis reactions, the process gas must be exceptionally pure and free of oxygen, sulfur, carbon dioxide, phosphorus, and particularly carbon monoxide, any of which would act as a catalyst poison. The usual methods for removing the final 1 or 2 percent of carbon monoxide from ammonia synthesis gas, i.e. by copper liquor or liquid nitrogen scrubbing or either high or low pressure methanation, require substantial investments in equipment and operating and maintenance costs. For these reasons it is desired to develop a more economical process for the removal of carbon monoxide from ammonia synthesis gas.

In accordance with the present invention, a gaseous mixture comprising carbon monoxide, carbon dioxide, hydrogen and nitrogen, or other gas which may not enter into the reaction, is mixed with air or other oxygen containing gas to give the desired oxygen to carbon monoxide ratio. The gas mixture, either dry, partially saturated with water or completely saturated with water, is then passed over a supported platinum catalyst, which results in the preferential oxidation of carbon monoxide to carbon dioxide with a simultaneous reaction of hydrogen and oxygen to form water. The gaseous mixture is then passed through a scrubber or absorber in which the carbon dioxide is removed and the gaseous mixture, which then consists of nitrogen and hydrogen (with or without small amounts of methane) is then passed over the ammonia synthesis catalyst. The gaseous mixture may be saturated with water either before or after the addition of air.

The process of the present invention may also be operated in a plurality of stages, and in this case, air or an oxygen-containing gas is added to the gaseous mixture which is dry or partially or completely saturated with water and the resulting mixture is passed over the platinum catalyst, cooled and the water removed therefrom, and then through the carbon dioxide absorber, after which additional air or oxygen-containing gas is added and the resulting gas mixture is passed over a second stage platinum catalyst for further conversion of traces of carbon monoxide to carbon dioxide, after which the gas is passed through a second stage absorber and then into the ammonia synthesis reactor. If desired, the second stage platinum catalyst may be replaced by a methanator, in which the carbon dioxide and carbon monoxide react with hydrogen to form methane and water.

Figure 2:
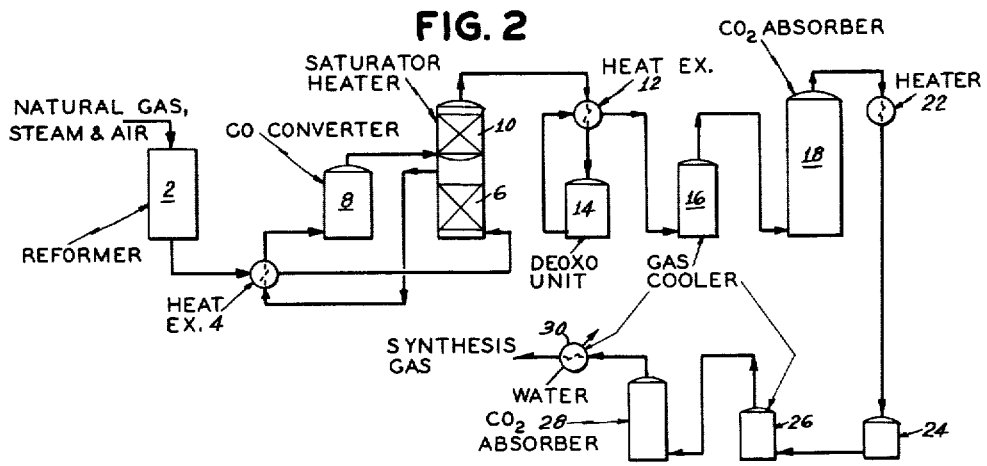
Figure 3:
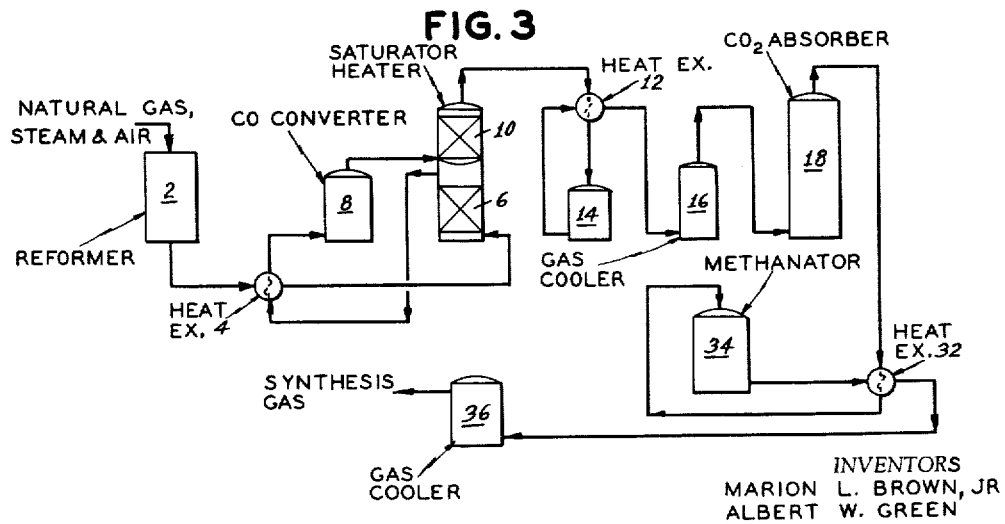
Figure 4:
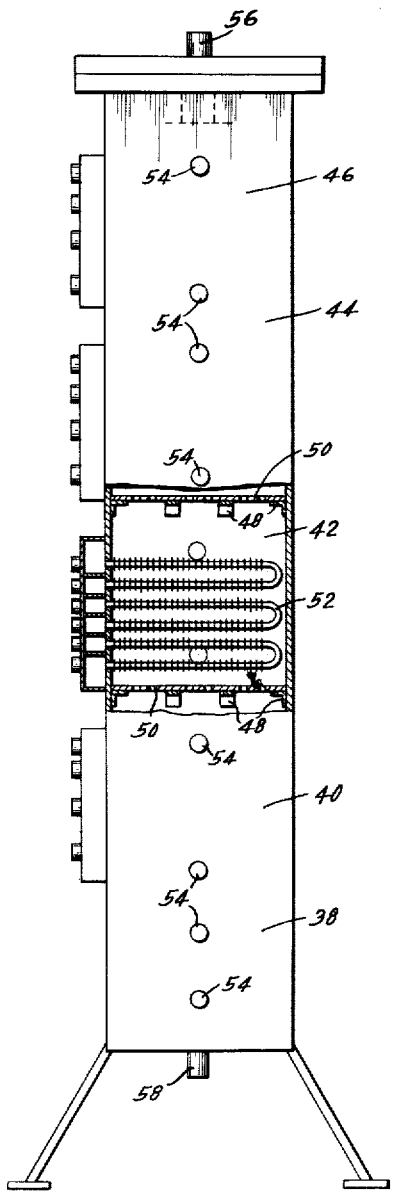

Referring to the accompanying drawings,

FIGURE 1 is a flow diagram showing the utilization of a single stage supported platinum catalyst for converting carbon monoxide to carbon dioxide in a gaseous mixture which is to be used in ammonia synthesis, FIGURE 2 is a flow diagram of a two-stage catalytic process for the conversion of carbon monoxide to carbon dioxide in the preparation of an ammonia synthesis gas, FIGURE 3 is a flow diagram of a single stage catalytic unit for the conversion of carbon monoxide to carbon dioxide, in the preparation of ammonia synthesis gas, in which the single stage catalytic unit is coupled with a methanator, and FIGURE 4 is a view in elevation, partly broken away, showing one type of catalytic reactor used for the conversion of carbon monoxide to carbon dioxide.

Referring to FIGURE 1 of the drawings, a mixture of steam, air and natural gas is fed through a reformer furnace 2, the mixture passing through tubes which are loaded with a catalyst and which are exteriorly heated. Reforming takes place at a temperature of about 1600° F. and results in the formation of hydrogen, carbon dioxide and carbon monoxide. A small amount of methane also remains in the gas. Any nitrogen which entered with the air remains in the gas. The effluent gases from the reformer furnace are heat exchanged in a heat exchanger 4, and are passed into a saturator 6 in which the gases are saturated with water vapor. From the saturator, the gases are passed into a carbon monoxide converter, or shift converter 8 in which carbon monoxide is reacted with water vapor to produce carbon dioxide and hydrogen. The effluent gases from the carbon monoxide converter 8 are then cooled by contact with water in the heater tower 10.

The effluent gases from the heater tower 10 being saturated with water vapor at a temperature of approximately 190° F., are heat exchanged in the heat exchanger 12, to raise the temperature of the feed in the catalytic unit 14 to about 230° F. The catalytic unit 14 contains a supported platinum catalyst. Air is added to the catalytic unit 14 to give the desired oxygen to carbon monoxide ratio and, as the admixture of gases passes through the catalytic unit, carbon monoxide is oxidized to carbon dioxide, and a small amount of hydrogen combines with excess oxygen to form water. The effluent gases from the catalytic unit 14 are cooled in the heat exchanger 12 and are passed through the gas cooler 16. From the gas cooler 16, the exuent gases pass through an absorber 18 in which the carbon dioxide in the gases is absorbed by monoethanolamine. After passing through the gas cooler 20, the gases may be passed directly to the ammonia synthesis process.

Referring to FIGURE 2 of the drawing, a similar arrangement is provided, except that the effluent gases from the carbon dioxide absorber 18 are passed through a heater 22, and then into a second stage catalytic unit 24, containing a supported platinum catalyst, in which the carbon monoxide is oxidized to carbon dioxide. The effluent gases from the second stage catalytic unit 24 are then passed to the gas cooler 26 and then into the second stage carbon dioxide absorber 28 in which carbon dioxide is removed by absorption in monoethanolamine. Final cooling of the gas is effected from the gas cooler 30, after which the gases are passed into the ammonia synthesis reactor.

FIGURE 3 shows an alternative arrangement in which the effluent gases from the carbon dioxide absorber 18 are heated to a temperature of about 600° F. in the heat exchanger 32, and are then passed into the methanator 34 in which carbon dioxide and carbon monoxide react with hydrogen to form methane and water. The effluent gases from the methanator 34 are then passed through the cooler 36 and may then be used in the synthesis of ammonia.

The inlet gas which is treated in accordance with the present invention, may contain, on a dry basis and before the addition of air, from a few parts per million to about 3 percent by volume of carbon monoxide, from about 0 to about 25 percent by volume of carbon dioxide; from about 0 to 10 percent by volume, preferably 0 to 2 percent methane; from 0 to 80 percent by volume, preferably 50 to 75 percent, hydrogen; and from 0 to 50 percent by volume, preferably 15 to 40 percent, of nitrogen. To this mixture, steam may be added, preferably saturated, in a quantity equivalent to about 0 to 300 percent, preferably 60 to 150 percent, by volume.

The temperature in the catalytic unit containing the platinum catalyst may be in the range of about 60 to 1200° F., preferably 200 to 450° F., and the pressure may be in the range of about atmospheric to 300 p.s.i.g.

The space velocity of the gases passed over the platinum catalyst may be in the range of about 100 to 25,000 cubic feet of gas per hour per cubic foot of catalyst, preferably 4000 to 6000 cubic feet per hour per cubic foot of catalyst, for a single stage operation. For a two stage operation, the same velocity as that given above is used in the first stage while in the second stage, the space velocity may be in the range of about 100 to 30,000 cubic feet per hour per cubic foot, and is preferably 4000 to 6000 cubic feet per hour per cubic foot.

Sufficient air is added to the gaseous mixture to provide an oxygen to carbon monoxide ratio, by volume, in the range of about 3:1 to 0.25:1, preferably about 1.5 to 1 on a dry basis.

The catalyst used is platinum metal on a suitable support, and suitable catalyst supports include alumina, silica, kieselguhr, silica gel, diatomaceous earth and the like, and preferably comprises activated alumina pellets. The catalyst metal may be present in the range of about 0.01 to 5 percent by weight of the catalyst metal and support, preferably about 0.05 to 2 percent by weight of the catalyst metal and support. The supported catalyst may be prepared in any suitable manner, i.e. by treating the carrier or support with a solution of a suitable metal compound, and then reducing the metal compound to metal.

Referring to FIGURE 4 of the drawings, one type of reactor is shown for converting carbon monoxide to carbon dioxide, by passing an admixture of gases containing carbon monoxide over a platinum catalyst. The reactor consists of a square, carbon steel shell divided into five sections 38, 40, 42, 44 and 46, respectively, into which catalyst was loaded. Each section contained a plurality of brackets 48, which were welded to the inside wall of the steel shell, these brackets serving to hold the catalyst supports 50, which consisted of ⅛" perforated plates containing ⅜" holes on ½" centers, a sheet of No. 4 mesh 18 gauge brass wire screen, and a sheet of No. 16 mesh 0.035" brass wire screen. The top four sections of the reactor were provided with the cooling coil bundles 52, as shown in the broken away section 42, these bundles being imbedded in the catalyst bed for the purpose of removing the heat of reaction. The coil bundles consisted of ⅜" O.D. finned copper U tubes fitted into segmented water distributors. The vessel was insulated with 2" of hydrous calcium silicate.

The catalyst was loaded into each of the five sections 38, 40, 42, 44 and 46 of the reactor to a depth of 10", with approximately 3" of free space being left between each bed, the catalyst being loaded so that the cooling coil bundles were completely imbedded in the catalyst. The catalyst consisted of 0.3 percent platinum on ⅛" activated alumina pellets, and approximately 100 pounds of catalyst were used to charge the reactor. More catalyst was loaded in the bottom catalyst bed, since this section contained no cooling coil bundle. Approximately 29 pounds of catalyst were loaded into the bottom section, with about 17½ pounds being loaded into each of the other four sections.

Temperatures in each catalyst bed were indicated by the dial-type thermometers 54, mounted in the sides of the reactor at a distance of 6¾" apart. The bulbs of the thermometers extended into the centers of the catalyst beds. Dial-type thermometers, not shown, were also provided in the inlet gas line 56 and the outlet gas line 58, as well as the inlet water line, not shown, which supplied the cooling coil bundles, the outlet of each segmented section of the cooling coil bundles, and the exit line in the cooling coil bundles. Pressure gauges, not shown, indicated the inlet and outlet gas pressures.

Test runs using the reactor of FIGURE 4 were first carried out by bringing the catalyst bed temperatures up to a temperature of about 200° F. by passing water at a temperature of about 215° F. through the cooling coil bundles. The gas flow was introduced at the desired process rate and permitted to purge the reactor for several minutes, and air, at a rate to produce the desired ratio of oxygen to carbon monoxide, was then introduced. The runs were then made at the desired conditions of temperature and space velocity and, at the completion of a run, the air flow was shut off first and gas was allowed to purge the reactor for several minutes, and was then shut off. As successive test runs were made, the activity of the catalyst decreased rapidly, and since gas was contacting the catalyst for several minutes between successive runs, it was obvious that a catalyst poison was present in the gas stream.

In order to ascertain if one of the gas constituents was forming a stable film and retarding the reaction, several runs were made in which the catalyst was contacted with gas for varying periods of time in the absence of air, and then a regular test run was made. The concentration of unconverted carbon monoxide in the exit gas in each case was found to be proportional to the length of time that gas in the absence of air contacted the catalyst. In other words, the longer the time of contact of the catalyst with the gas in the absence of air, the greater was the loss in catalyst activity Attempts to reactivate the catalyst by passing a stream of hot air over the catalyst proved very successful. Test runs were made in which the catalyst was contacted with gas in the absence of air for about 15 minutes, and then a regular run was made and the concentration of unconverted carbon monoxide in the exit gas was ascertained.

The run was then terminated, and air at a temperature of 250° F., or higher, was passed over the catalyst for a period of approximately 30 minutes. Another test run was then made under the same conditions as the previous run, and again the concentration of carbon monoxide in the exit gas was determined. Each time the results showed that the catalyst activity, after contact with hot air, had increased considerably.

In order to eliminate the poisoning effect of the gas on the catalyst, a new procedure for start up and shut down of the reactor was devised in which the catalyst bed was brought up to the desired temperature, by passing hot water at about 270° F. through the cooling coil bundles imbedded in the catalyst, and air at a temperature of about 270° F. was then passed over the catalyst for about 10 minutes. Steam flow, which was required for control of the reactor temperature, was introduced at the desired rate and air flow was shut off. Then, after a few minutes of purging the unit with steam, air and gas were simultaneously introduced into the reactor at the desired rate. At the completion of a test run, the gas and air were simultaneously shut off, with the steam flow being continued. Gas alone never contacted the catalyst and thereby the possibility of the gas poisoning the catalyst was eliminated.

The invention will be further illustrated by reference to the following specific examples:

EXAMPLE I

A gas having the following composition (by volume, on a dry basis before the addition of air):

| | Percent |
|---|---|
| $CO_2$ | 17 |
| CO | 1.7 |
| $CH_4$ | 0.3 |
| $H_2$ | 61.0 |
| $N_2$ | 20.0 | was saturated with water at a temperature of 195° F. and a pressure of 11.5 p.s.i.g. Sufficient air was added to the gas to produce a ratio of 2 volumes of oxygen to 1 volume of carbon monoxide, and the resulting mixture was passed into a reactor containing a catalyst consisting of 0.3 percent platinum on ⅛" activated alumina pellets, as disclosed in FIGURE 4 of the drawings. The gas mixture was passed over the catalyst at a space velocity of 4000 cubic feet of gas per hour per cubic foot of catalyst, at a reactor pressure of 11.5 p.s.i.g. The inlet temperature of the gas-air mixture to the reactor was 185° F. The catalyst bed temperature was in the range of 200 to 310° F., being highest in the middle of the reactor and lowest at the inlet end. The inlet bed temperature was 200° F., in the middle of the reactor the temperature was 310° F., and at the outlet, the temperature was 280° F. The catalyst bed temperature was maintained by the use of circulating water through the cooling coils, the water having a temperature of 275° F. The gas leaving the reactor had a carbon monoxide concentration in the range of 40 to 80 parts per million.

EXAMPLE II

The general procedure of Example I above was repeated, using a feed gas having the same composition except that the gas was saturated with water at a temperature of 95° F. instead of 195° F., resulting in a water vapor content in the inlet gas of approximately 2 percent, and sufficient air was added to the gas to give an oxygen to carbon monoxide ratio of 1.5:1 by volume. The reactor pressure was 11 p.s.i.g., and the catalyst bed temperature ranged from 230 to 500° F. The carbon monoxide concentration in the exit was gas in the range of 100 to 300 parts per million.

EXAMPLE III

The general procedure of Example I was repeated, using a feed gas having the following composition (by volume, on a dry basis):

| | Percent |
|---|---|
| CO | 2 |
| $CH_4$ | 0.4 |
| $H_2$ | 73.5 |
| $N_2$ | 24.1 |

The gas was saturated with water vapor at a temperature of 65° F. and a pressure of 10 p.s.i.g. Sufficient air was added to provide an oxygen to carbon monoxide ratio of 1.4:1 by volume. The inlet temperature of the gas to the catalyst bed was 230° F., and the catalyst bed temperature was in the range of 230 to 500° F. The carbon monoxide concentration in the exit gas was in the range of 200 to 4000 parts per million.

EXAMPLE IV

The general procedure of Example I was repeated, using a gas having the same composition as that employed in Example III above. Steam was added to the feed gas instead of saturating the feed gas with water vapor, the steam to gas ratio being 2:1 by volume, and sufficient air was added to the feed gas to provide an oxygen to carbon monoxide ratio of 2.3:1 by volume. The gas inlet temperature to the catalyst bed was 265° F., and the catalyst bed temperature was in the range of 236 to 325° F. The reaction pressure was 10 p.s.i.g. The carbon monoxide concentration in the exit gas was below 10 parts per million.

EXAMPLE V

The general procedure of Example I was repeated, except that the reaction temperature was maintained in the range of 275 to 375° F., and the methane content of the exit gas was reduced to 0.1 percent, by volume on a dry basis. This shows that methane is also oxidized to carbon dioxide.

EXAMPLE VI

*Two-Stage Operation*

The gas feed in the first catalytic stage was a gas having the same composition as that disclosed in Example I above, and the gas was saturated with water vapor at a temperature of 195° F. and a pressure of 11.5 p.s.i.g. Sufficient air was added to provide an oxygen to carbon monoxide ratio in the range of 1.5–2:1 by volume. The space velocity was 4000 volumes of gas per hour per volume of catalyst, and the inlet temperature of the gas to the catalyst bed was 185° F. The catalyst bed temperature was in the range of 185 to 400° F., and the cooling water temperature was in the range of 268–282° F. The carbon monoxide concentration in the exit gas was in the range of 40 to 400 parts per million.

The exit gas was passed through a cooler in which the gas was saturated with water vapor at a temperature of 65° F., and at a pressure of 10 p.s.i.g. The cooled gas was then passed through a carbon dioxide scrubber, and the carbon dioxide content was lowered to about 2 percent by volume. The scrubbed gas was then passed through a second stage catalytic unit containing 0.3 percent by weight platinum on ⅛" activated alumina pellets. The inlet temperature to the catalyst bed was in the range of 300 to 350° F. Sufficient air was added to the gas to provide an oxygen to carbon monoxide ratio of 2.3:1 by volume, and the space velocity was in the range of 12,000 to 15,000 volumes of gas per hour per volume of catalyst. The carbon monoxide concentration in the exit gas was in the range of 3 to 7 parts per million.

EXAMPLE VII

The general procedure of Example I was repeated, except that a gas having the composition of that used in Example III was employed. The same reaction conditions were also employed as those of Example III. The methane content of the exit gas was reduced from 0.3 to 0.1 percent by volume.

EXAMPLE VIII

The general procedure of Example I was prepeated using a gas having the same composition as that used in Example I, and the same reaction conditions. The gas was passed over a catalyst having the same composition as that used in Example I, in the absence of air, for several minutes, and then air was introduced. The carbon monoxide content in the exit gas was in the range of 1,000 to 2,000 parts per million. The air and gas feed were then shut off, and steam was passed, at a temperature of 225° F., over the catalyst for a few minutes, after which the steam was turned off and air was passed, at a temperature of 225° F., over the catalyst for a few minutes. Steam was then passed over the catalyst and the air was turned off. Feed gas was then introduced, together with the steam, and as soon as the gas flow was established, air was added. The carbon monoxide content in the exit gas was reduced to 40 parts per million.

These data show that the poisoned catalyst was regenerated by the air treatment which eliminated the deleterious effect of the feed gas being passed over the catalyst in the absence of air.

EXAMPLE IX

The general procedure of Example I is repeated, using a gas having the same composition as the gas in Example I. Sufficient air is added to the gas to provide an oxygen to carbon monoxide ratio of 1.5:1 by volume. The effluent gas from the platinum catalyst unit contains about 1000 parts per million of carbon monoxide, and this gas is passed through a carbon dioxide absorber to remove substantially all the carbon dioxide. The gas is then heated to a temperature of 600° F. and passed through a methanator. The carbon monoxide in the effluent gas from the methanator is reduced below 10 parts per million.

While the foregoing examples have been described in connection with a catalyst consisting of 0.3 percent by weight platinum on ⅛" activated alumina pellets, other catalysts are equally efficacious and in some cases more so, such as 0.1 to 0.3 percent by weight platinum on ⅜"

activated alumina pellets, or the platinum content could vary from 0.01 to 2 percent.

It will be obvious to those skilled in the art that many modifications may be made within the scope of the present invention without departing from the spirit thereof, and the invention includes all such modifications.

What is claimed is:

1. A process which comprises adding water vapor to a gaseous mixture comprising hydrogen, nitrogen, carbon dioxide, and carbon monoxide, the water vapor being added to the mixture in an amount within the range of 60 to 300 percent by volume of said gaseous mixture, adding sufficient oxygen bearing gas to the gas to provide an oxygen to carbon monoxide volume ration in the range of about 3:1 to 0.25:1, and passing the resulting gaseous mixture over a supported platinum catalyst at an elevated temperature, whereby the carbon monoxide in the gas is substantially completely converted to carbon dioxide.

2. A process according to claim 1 in which the gaseous mixture is passed over the catalyst at a temperature in the range of about 200° F. to 450° F.

3. A process according to claim 1 in which the gaseous mixture is passed over the catalyst at a space velocity in the range of about 100 to 25,000 cubic feet of gas per hour per cubic foot of catalyst.

4. A process according to claim 1 in which the gaseous mixture contains methane which is oxidized to carbon dioxide in the process.

5. A process which comprises adding water vapor to a gaseous mixture comprising hydrogen, nitrogen, carbon dioxide and carbon monoxide, the water vapor being added to the mixture in an amount within the range of 60 to 300 percent by volume of said gaseous mixture, adding sufficient oxygen bearing gas to the resulting gaseous mixture to provide an oxygen to carbon monoxide volume ratio in the range of about 3:1 to 0.25:1, passing the resulting gaseous mixture over a first stage supported platinum catalyst at an elevated temperature, removing the carbon dioxide from the effluent gases, passing the effluent gases over a second stage supported platinum catalyst at an elevated temperature, whereby the carbon monoxide in the gas is substantially completely converted to carbon dioxide.

6. A process according to claim 5 in which the gaseous mixture is passed over the catalyst at a temperature in the range of about 200° F. to 450° F.

7. A process according to claim 5 in which the gaseous mixture is passed over the first stage catalyst at a space velocity in the range of about 100 to 25,000 cubic feet of gas per hour per cubic foot of catalyst, and the gaseous mixture is passed over the second stage catalyst at a space velocity in the range of about 100 to 30,000 cubic feet of gas per hour per cubic foot of catalyst.

8. A process according to claim 5 in which the gaseous mixture contains methane which is oxidized to carbon dioxide in the process.

9. A process which comprises adding water vapor to a gaseous mixture comprising hydrogen, nitrogen, carbon dioxide and carbon monoxide, the water vapor being added to the mixture in an amount within the range of 60 to 300 percent by volume of said gaseous mixture, adding sufficient oxygen bearing gas to the resulting gaseous mixture to provide an oxygen to carbon monoxide volume ratio in the range of about 3:1 to 0.25:1, passing the resulting gaseous mixture over a supported platinum catalyst at an elevated temperature whereby the carbon monoxide in the gas is substantially completely converted to carbon dioxide, removing the carbon dioxide from the effluent gases, and passing the effluent gases through a methanator.

10. A process according to claim 9 in which the gaseous mixture is passed over the platinum catalyst at a temperature in the range of about 200° F. to 450° F.

11. A process according to claim 9 in which the gaseous mixture is passed over the platinum catalyst at a space velocity in the range of about 100 to 25,000 cubic feet of gas per hour per cubic foot of catalyst.

References Cited in the file of this patent

UNITED STATES PATENTS

| | | |
|---|---|---|
| 417,068 | Mond | Dec. 10, 1889 |
| 1,425,579 | Clancy | Aug. 15, 1922 |
| 2,103,219 | Jenness | Dec. 21, 1937 |
| 2,103,220 | Jenness | Dec. 21, 1937 |
| 2,103,221 | Jenness | Dec. 21, 1937 |
| 2,641,582 | Haensel | June 9, 1953 |
| 2,671,763 | Winstrom et al. | Mar. 9, 1954 |
| 2,759,799 | Berg | Aug. 21, 1956 |
| 2,795,558 | Eastman | June 11, 1957 |
| 2,795,559 | Whaley | June 11, 1957 |
| 2,867,497 | Houdry et al. | Jan. 6, 1959 |

FOREIGN PATENTS

| | | |
|---|---|---|
| 299,492 | Great Britain | Oct. 25, 1928 |
| 302,306 | Great Britain | Dec. 19, 1929 |
| 436,906 | Great Britain | Oct. 21, 1935 |

UNITED STATES PATENT OFFICE
CERTIFICATE OF CORRECTION

Patent No. 3,088,919 May 7, 1963

Marion L. Brown, Jr., et al.

It is hereby certified that error appears in the above numbered patent requiring correction and that the said Letters Patent should read as corrected below.

Column 2, line 37, for "exuent" read -- effluent --; column 6, line 37, for "prepeated" read -- repeated --; column 7, line 14, for "ration" read -- ratio --.

Signed and sealed this 19th day of November 1963.

(SEAL)
Attest:
ERNEST W. SWIDER

EDWIN L. REYNOLDS

Attesting Officer

Acting Commissioner of Patents